US009645966B2

United States Patent
Santamaria et al.

(10) Patent No.: US 9,645,966 B2
(45) Date of Patent: May 9, 2017

(54) SYNCHRONIZING HANDLES FOR USER ACCOUNTS ACROSS MULTIPLE ELECTRONIC DEVICES

(71) Applicant: Apple Inc., Cupertino, CA (US)

(72) Inventors: Justin E. Santamaria, San Francisco, CA (US); Justin M. N. Wood, Sunnyvale, CA (US); Andrew H. Vyrros, San Francisco, CA (US)

(73) Assignee: APPLE INC., Cupertino, CA (US)

( * ) Notice: Subject to any disclaimer, the term of this patent is extended or adjusted under 35 U.S.C. 154(b) by 413 days.

(21) Appl. No.: 13/675,902

(22) Filed: Nov. 13, 2012

(65) Prior Publication Data
US 2013/0332607 A1     Dec. 12, 2013

Related U.S. Application Data

(60) Provisional application No. 61/657,415, filed on Jun. 8, 2012.

(51) Int. Cl.
*G06F 15/173* (2006.01)
*H04L 29/06* (2006.01)

(52) U.S. Cl.
CPC ........ *G06F 15/173* (2013.01); *H04L 63/0823* (2013.01); *H04L 63/102* (2013.01)

(58) Field of Classification Search
CPC ............ H04L 63/0407; H04L 63/0823; H04L 29/06775; H04L 12/1813; H04L 51/046; H04L 51/18; H04W 8/18; H04W 12/00; G06Q 20/3821; G06Q 30/018
USPC ............... 726/6–8; 455/406, 435.1; 709/204; 370/260; 715/747
See application file for complete search history.

(56) References Cited

U.S. PATENT DOCUMENTS

| 7,428,750 | B1 * | 9/2008 | Dunn et al. ........................ 726/8 |
| 8,306,532 | B2 * | 11/2012 | Rahman et al. ............ 455/435.1 |
| 2006/0116105 | A1 * | 6/2006 | Frankel et al. ............... 455/406 |
| 2009/0138953 | A1 | 5/2009 | Lyon |
| 2009/0177974 | A1 * | 7/2009 | Cox et al. ..................... 715/747 |
| 2009/0262668 | A1 * | 10/2009 | Hemar et al. ................. 370/260 |
| 2009/0328173 | A1 * | 12/2009 | Jakobson et al. ................. 726/7 |

(Continued)

FOREIGN PATENT DOCUMENTS

| CN | 101800708 A | 8/2010 |
| EP | 2282477 A1 | 9/2011 |

OTHER PUBLICATIONS

English Abstract of CN101800708A published Aug. 11, 2010.

*Primary Examiner* — Dustin Nguyen
(74) *Attorney, Agent, or Firm* — Nicholas Panno; Page Ponsford; DLA Piper LLP US

(57) ABSTRACT

The disclosed embodiments provide a system that manages access to a user account from an electronic device. The system includes an identity service that provides a device token for the electronic device and a set of handles associated with the user account to the electronic device. Next, the identity service receives, from the electronic device, a handle registration containing one or more selected handles from the set of handles. Finally, the identity service transmits an identity certificate comprising an association between the selected handles and the electronic device to the electronic device, wherein the identity certificate and the association are used to route data associated with the selected handles to and from the electronic device.

33 Claims, 5 Drawing Sheets

(56) References Cited

U.S. PATENT DOCUMENTS

2011/0099612 A1* 4/2011 Lee et al. ............................ 726/6
2011/0167114 A1* 7/2011 Blanchard et al. ............ 709/204
2011/0302630 A1 12/2011 Nair

* cited by examiner

SYNCHRONIZING HANDLES FOR USER ACCOUNTS ACROSS MULTIPLE ELECTRONIC DEVICES

RELATED APPLICATIONS

This application is a non-provisional application of, and hereby claims priority under 35 U.S.C. §119 to, U.S. provisional patent application No. 61/657,415, titled "Synchronizing Handles for User Accounts Across Multiple Electronic Devices," by inventors Justin E. Santamaria, Justin N. Wood, and Andrew H. Vyrros, which was filed on 8 Jun. 2012, and which is incorporated by reference.

The subject matter of this application is related to the subject matter in a co-pending non-provisional application by inventors Alexander A. Medina, Andrew H. Vyrros, Darryl N. Bleau, Jeffrey T. Davey, Justin E. Santamaria, Justin N. Wood, and Thomas Devanneaux, entitled "System and Method for a Secure Identity Service," having Ser. No. 13/224,626, and filing date 10 Feb. 2012.

BACKGROUND

Field

The disclosed embodiments relate to identity management. More specifically, the disclosed embodiments relate to techniques for synchronizing handles for user accounts across multiple electronic devices.

Related Art

Network-enabled users commonly use multiple user accounts, handles, and/or electronic devices to access products, services, and/or resources on the Internet. For example, a user may maintain different sets of account credentials (e.g., usernames and passwords, biometric data, etc.) for user accounts with financial institutions, social networks, digital media stores, e-commerce websites, and/or communications applications.

Moreover, each user account may be associated with a number of handles, such as email addresses, phone numbers, and nicknames, that allow the user to be identified by other users. For example, the user may add multiple email addresses to his/her social networking profile to allow other users to locate and/or connect to the user. Similarly, the user may log into an instant-messaging (IM) application using multiple usernames with one or more IM networks to communicate with different sets of contacts associated with the usernames and/or IM networks.

Finally, the user may configure different electronic devices, such as personal computers, laptop computers, tablet computers, mobile phones, portable media players, and/or personal digital assistants, for use with various user accounts and/or handles. For example, the user may configure an IM application on his/her work computer to send and receive IMs with contacts associated with the user's work email address. Conversely, the user may set up a video calling application on his/her home computer to send and receive video calls with contacts associated with the user's personal email addresses and/or telephone numbers. Because numerous associations may exist among the user accounts, handles, and electronic devices, the user may find management of and/or access to the user accounts, handles, and/or the electronic devices to be difficult, time-consuming, and/or confusing.

SUMMARY

The disclosed embodiments provide a system that manages access to a user account from an electronic device. The system includes an identity service that provides a device token for the electronic device and a set of handles associated with the user account to the electronic device. Next, the identity service receives, from the electronic device, a handle registration containing one or more selected handles from the set of handles. Finally, the identity service transmits an identity certificate containing an association between the selected handles and the electronic device to the electronic device, wherein the identity certificate and the association are used to route data associated with the selected handles to and from the electronic device.

In some embodiments, the system also includes the electronic device. First, the electronic device provides the handle registration to the identity service. After the electronic device receives the identity certificate from the identity service, the electronic device provides the identity certificate during verification of the association.

In some embodiments, the system also includes a directory service containing account information for the user account, wherein the account information includes account credentials for the user account and the set of handles.

In some embodiments, the electronic device also obtains the selected handles from a user of the electronic device. For example, the electronic device may display the set of handles to the user, and the user may provide the handle registration by selecting and/or highlighting a subset of the displayed handles on the electronic device.

In some embodiments, the identity service also receives an addition of a new handle to the user account from the directory service and transmits a notification to the electronic device.

In some embodiments, transmitting the notification to the electronic device includes adding the device token to the notification, and using the device token to transmit the notification to the electronic device.

In some embodiments, the electronic device uses the notification to update the selected handles with the new handle.

In some embodiments, the electronic device also activates use of the new handle on the electronic device.

In some embodiments, using the notification to update the selected handles with the new handle includes at least one of automatically updating the handle registration with the new handle, and notifying a user of the electronic device of the new handle.

In some embodiments, each handle from the set of handles is verified prior to obtaining the account credentials from the electronic device.

In some embodiments, the data is associated with at least one of a messaging application, a voice chat application, and a video calling application.

In some embodiments, the set of handles includes at least one of an email address and a phone number.

BRIEF DESCRIPTION OF THE FIGURES

In the figures, like reference numerals refer to the same figure elements.

DETAILED DESCRIPTION

Figure 1:
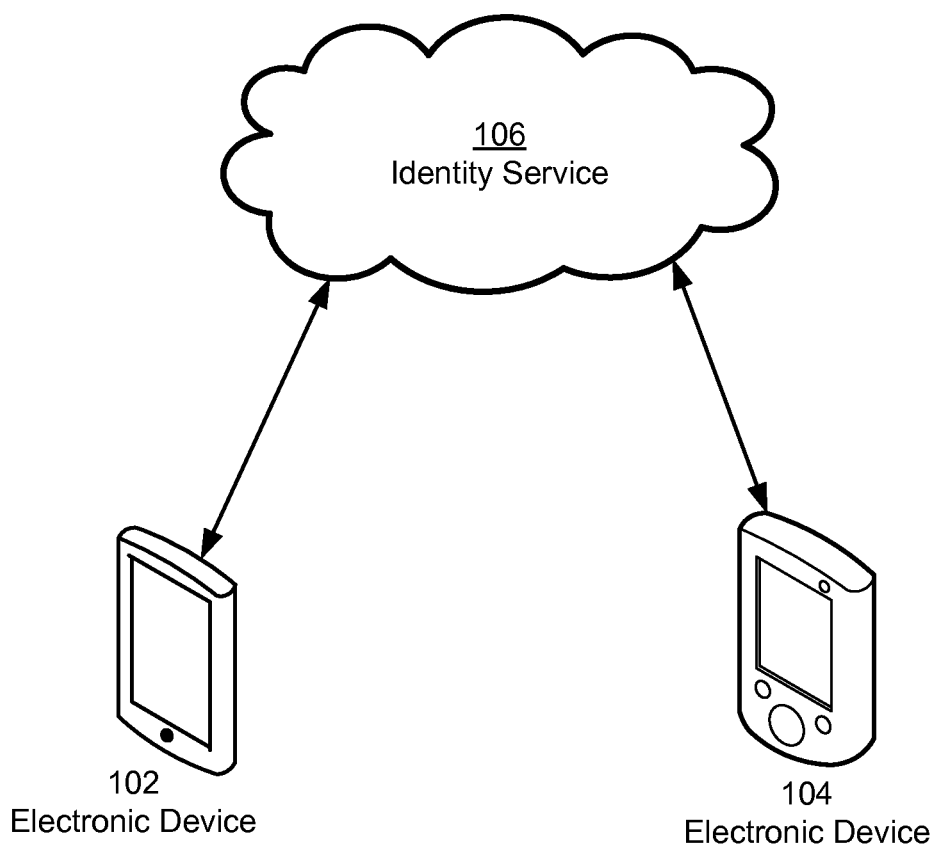
FIG. 1 shows a schematic of a system in accordance with the disclosed embodiments.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Data structures and code described in this detailed description are typically stored on a computer-readable storage medium, which may be any device or medium that can store code and/or data for use by an electronic device with computing capabilities. For example, the computer-readable storage medium can include volatile memory or non-volatile memory, including flash memory, random access memory (RAM, SRAM, DRAM, RDRAM, DDR/DDR2/DDR3 SDRAM, etc.), magnetic or optical storage mediums (e.g., disk drives, magnetic tape, CDs, DVDs), or other mediums capable of storing data structures or code. Note that in the described embodiments, the computer-readable storage medium does not include non-statutory computer-readable storage mediums such as transmission signals.

The methods and processes described in this detailed description can be included in hardware modules. For example, the hardware modules can include, but are not limited to, processing subsystems, microprocessors, application-specific integrated circuit (ASIC) chips, field-programmable gate arrays (FPGAs), and other programmable-logic devices. When the hardware modules are activated, the hardware modules perform the methods and processes included within the hardware modules. In some embodiments, the hardware modules include one or more general-purpose circuits that are configured by executing instructions (program code, firmware, etc.) to perform the methods and processes.

The methods and processes described in the detailed description section can be embodied as code and/or data that can be stored in a computer-readable storage medium as described above. When an electronic device with computing capabilities reads and executes the code and/or data stored on the computer-readable storage medium, the electronic device performs the methods and processes embodied as data structures and code and stored within the computer-readable storage medium. For example, in some embodiments, a processing subsystem can read the code and/or data from a memory subsystem that comprises a computer-readable storage medium, and can execute code and/or use the data to perform the methods and processes.

In the following description, we refer to "some embodiments." Note that "some embodiments" describes a subset of all of the possible embodiments, but does not always specify the same subset of the embodiments.

The disclosed embodiments provide a method and system for managing access to a user account from multiple electronic devices. As shown in FIG. 1, a user may use two electronic devices 102-104, such as personal computers, laptop computers, mobile phones, tablet computers, personal digital assistants (PDAs), digital media receivers, and/or portable media players, to access a user account managed by an identity service 106.

To access the user account from electronic devices 102-104, the user may transmit account credentials for the user account, such as a login and password, from electronic devices 102-104 to identity service 106. Once identity service 106 authenticates the user using the account credentials, the user may gain access to the user account and associated services, products, and/or resources on electronic devices 102-104. For example, the user may log into the user account to access a social-networking application, a financial-management application, a digital media store, a software vendor, a messaging application, a voice chat application, and/or a video calling application.

The user may also associate the user account with multiple handles, such as email addresses, phone numbers, nicknames, and/or other information by which the user is known to other users. For example, the user may use either electronic device 102-104 to add a personal email address and a work email address to the user account. Identity service 106 may confirm the validity of the email addresses by sending confirmation emails to the respective email addresses and detecting an action that verifies the user's ownership of the email addresses (e.g., clicking links in the confirmation emails, replying to the confirmation emails, providing codes in the confirmation emails, etc.).

In turn, the handles may allow the user to configure use of electronic devices 102-104 with the user account and/or interaction with other users through the user account. Continuing with the above example, the user may configure a messaging and/or video chat application on electronic device 102 (e.g., a personal use electronic device) to send and receive messages and/or video chats with users connected to the user's personal email address. Conversely, the user may configure the same application on electronic device 104 (e.g., a work electronic device) to send and receive messages and/or video chats with users connected to the user's work email address. In other words, the user may set up the same user account and application on different electronic devices 102-104 to send and receive different types of information and/or interact with different sets of users.

However, management of associations between the user account, handles, and electronic devices 102-104 may be tedious, time-consuming, and/or confusing to the user. For example, the user may be required to set up applications associated with the user account on electronic devices 102-104 by repeatedly logging into the user account on each application, manually adding (e.g., typing) each handle to be used with the application, and verifying the handle on the electronic device on which the application executes.

In one or more embodiments, the system of FIG. 1 includes functionality to reduce overhead associated with managing and/or synchronizing multiple handles for a single user account across multiple electronic devices 102-104. As discussed in further detail below, identity service 106 may streamline and/or simplify such management and/or synchronization by automatically providing handles associated with the user account to electronic devices 102-104, omitting unnecessary confirmation of handles from electronic devices 102-104, and automatically notifying electronic devices 102-104 of the addition of new handles to the user account.

Figure 2:
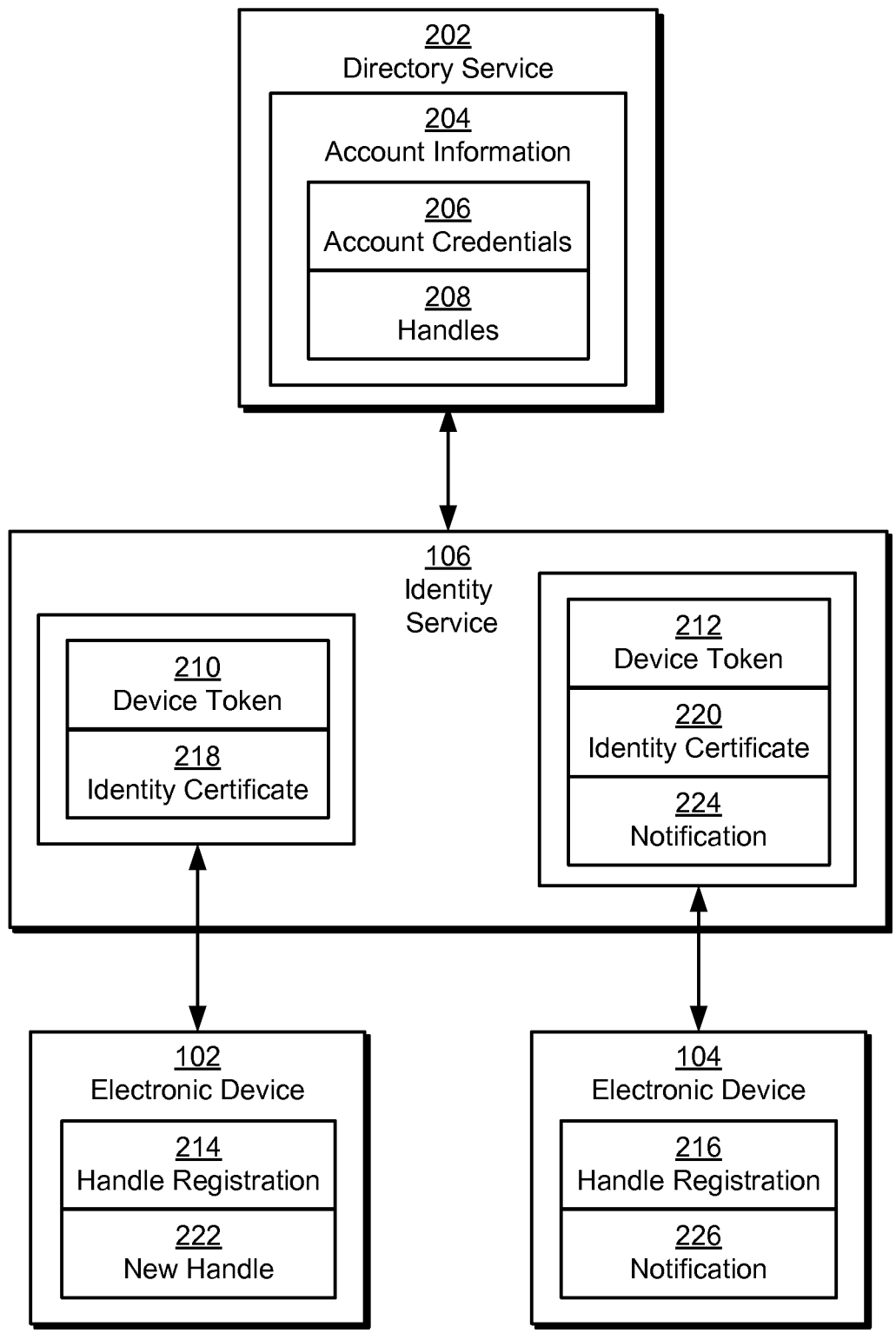
FIG. 2 shows a system for managing access to a user account from multiple electronic devices in accordance with the disclosed embodiments.

FIG. 2 shows a system for managing access to a user account from multiple electronic devices 102-104 in accordance with the disclosed embodiments. As shown in FIG. 2, account information 204 for the user account may be managed by a directory service 202 associated with identity service 106. For example, directory service 202 may maintain a repository (e.g., database) of account information 204 for each user account for which access is managed by identity service 106.

Each set of account information 204 may include account credentials 206 for accessing the user account and a set of handles 208 associated with the user account. For example, account credentials 206 may include a username and password, personal identification number (PIN), biometric data, and/or other data that can be used to authenticate the user associated with the user account. Similarly, handles 208 may contain phone numbers, email addresses, nicknames, and/or other data for identifying the user, along with a bit, flag, and/or field indicating if each handle has been verified by the user (e.g., by clicking a link in an email sent to the handle, providing a code sent in a Short Message Service (SMS) message to the handle, etc.).

As mentioned above, the user may configure and/or register electronic devices 102-104 for use with different handles 208 associated with the user account. For example, the user may create a handle registration 214 on electronic device 102 containing two personal email addresses and a mobile phone number and a handle registration 216 on electronic device 104 containing one work email address and two work phone numbers. The user may then use each electronic device 102-104 to send and receive messages, video calls, documents, articles, digital media, and/or other data associated with the handles registered on the electronic device to users connected to the handles.

In one or more embodiments, data associated with the handles on each electronic device 102-104 is signed by the electronic device and thus considered trusted, as described in a co-pending non-provisional application by inventors Alexander A. Medina, Andrew H. Vyrros, Darryl N. Bleau, Jeffrey T. Davey, Justin E. Santamaria, Justin N. Wood, and Thomas Devanneaux, entitled "System and Method for a Secure Identity Service," having Ser. No. 13/224,626, and filing date 10 Feb. 2012, which is incorporated herein by reference. The handles with which the electronic device is registered may thus form an integral part of the electronic device's trusted identity with identity service 106 and/or other electronic devices. To maintain the integrity of the electronic device's trusted identity, only the electronic device may request the addition of a new handle and/or the removal of an existing handle from the electronic device's handle registration.

To simplify and/or streamline the registration of handles 208 on electronic devices 102-104, identity service 106 may automatically provide handles 208 during configuration of a new electronic device (e.g., electronic devices 102-104) for use with the user account instead of requiring the user to manually input and verify one or more handles 208 from the electronic device. To initiate configuration of the electronic device for use with the user account, the user may provide account credentials 206 to the electronic device, and the electronic device may transmit account credentials 206 to identity service 106.

Once identity service 106 authenticates the user using account credentials 206, identity service 106 may provide a device token (e.g., device tokens 210-212) that uniquely identifies the electronic device and allows the electronic device to be located during routing of notifications to the electronic device. For example, identity service 106 and/or a notification service such as Apple Push Notification service (APNs) may transmit an authentication token and/or push token for the electronic device to the electronic device, and the electronic device may register the authentication and/or push tokens with identity service 106, as described in the above-referenced application.

Next, identity service 106 may provide the set of handles 208 associated with the user account to the electronic device. Handles 208 may be previously added to the user account during registration of a different electronic device for use with the user account and/or a device-agnostic setup and/or configuration of the user account. For example, handles 208 may include a primary email address for the user obtained during initial (e.g., web-based) registration of the user account with identity service 106 and a mobile phone number obtained during registration of the user's mobile phone for use with the user account. Handles 208 may also be verified by the user before configuration of the electronic device with identity service 106 is initiated.

In turn, the electronic device may provide handles 208 to the user and obtain a handle registration (e.g., handle registrations 214-216) containing one or more selected handles from the set of handles 208 from the user. For example, the electronic device may display handles 208 within a graphical user interface (GUI) to the user and obtain the handle registration as the subset of the displayed handles 208 highlighted and/or selected by the user through the GUI.

The handle registration may then be transmitted from the electronic device to identity service 106, and identity service 106 may create an identity certificate (e.g., identity certificates 218-220) containing an association between the selected handles and the electronic device. For example, identity service 106 may generate the identity certificate as a signature over one or more device tokens (e.g., authentication tokens, push tokens, etc.) for the electronic device and the selected handles in the electronic device's handle registration.

Finally, identity service 106 may transmit the identity certificate to the electronic device to complete registration of the electronic device with the selected handles. Identity service 106 may also maintain identity certificate 106 and/or the association in a repository (e.g., database), along with the device token(s) and/or other data for establishing the electronic device's trusted identity. The identity certificate may subsequently be used by the electronic device, other electronic devices, notification service, and/or identity service 106 to route data associated with the selected handles to and from the electronic device and/or verify the association (e.g., the electronic device's trusted identity), as described in the above-referenced application.

Identity service 106 may also synchronize handles 208 for the user account across electronic devices 102-104 after electronic devices 102-104 have been registered with identity service 106 and configured for use with the user account. As shown in FIG. 2, a new handle 222 may be to the user account by electronic device 102. For example, the user may add new handle 222 by inputting new handle 222 into electronic device 102 and transmitting new handle 222 to identity service 106. The user may then verify the validity of new handle 222 by performing an action requested by identity service 106. For example, the user may verify ownership of an email address by navigating to a link within an email sent from identity service 106 to the email address. Similarly, the user may verify a phone number by providing a verification code sent by identity service 106 to the phone number using a voicemail and/or SMS message.

Identity service 106 may detect the addition and/or verification of new handle 222 by, for example, receiving a message from directory service 202. To synchronize the addition of new handle 222 to the user account with electronic device 104, identity service 106 may transmit a notification 224 (e.g., an APNs push notification) to electronic device 104, and electronic device 104 may use notification 224 to update the selected handles in handle registration 216 with new handle 222.

For example, identity service 106 may transmit notification 224 by adding device token 212 to notification 224 and using device token 212 to transmit notification 224 to electronic device 104 through APNs. Upon receiving notification 224, electronic device 104 may request an up-to-date set of handles 208 for the user account by providing device token 212 to identity service 106 (e.g., similar to initial registration and/or configuration of electronic device 104 with identity service 106). After identity service 106 provides handles 208 to electronic device 104, electronic device 104 may transmit a new handle registration 216 containing new handle 222 to identity service 106 and receive a new identity certificate 220 containing a new association between electronic device 104 and new handle 222 from identity service 106.

Furthermore, electronic device 104 may automatically update handle registration 216 with new handle 226 or provide a notification 226 to the user of new handle 222. For example, electronic device 104 may add new handle 222 to handle registration 216 without notifying the user if the user has selected a setting in electronic device 104 to automatically synchronize handle registration 216 with new handles (e.g., new handle 222) added to the user account. On the other hand, electronic device 104 may provide notification 226 (e.g., a pop-up) to the user and/or query the user for approval to add new handle 222 to handle registration 216 if the user has not selected the automatic synchronization setting in electronic device 104. Because notification 226 allows electronic device 104 to decide how to react to the addition of new handle 222 to the user account instead of automatically adding new handle 222 to handle registration 216, notification 226 may allow handles 208 to be synchronized with electronic devices 102-104 without compromising the trusted identities of electronic devices 102-104.

If new handle 222 is added to handle registration 216, electronic device 104 may activate use of new handle 222 on electronic device 104. For example, electronic device 104 may configure a messaging application, voice chat application, and/or video calling application to send and receive messages, voice chats, and/or video calls using new handle 222.

By automatically providing handles 208 to electronic devices 102-104 during registration of electronic devices 102-104 for use with the user account, identity service 106 and/or electronic devices 102-104 may mitigate the time, effort, and/or confusion associated with manually registering and verifying individual handles 208 on each electronic device 102-104. The system of FIG. 2 may further streamline management of access to the user account from electronic devices 102-104 by providing notifications (e.g., notification 224) of changes to handles 208 to electronic devices 102-104, thus allowing electronic devices 102-104 to synchronize changes to handles 208. Finally, the system of FIG. 2 may perform such registration of electronic devices 102-104 and/or synchronization of handles 208 without redefining and/or weakening the trusted identities of electronic devices 102-104 with identity service 106 and/or other electronic devices.

Those skilled in the art will appreciate that the system of FIG. 2 may be implemented in a variety of ways. First, identity service 106 and directory service 202 may be provided by the same software and/or hardware component, or identity service 106 and directory service 202 may execute independently from one another. For example, identity service 106 and directory service 202 may be provided by one or more servers, databases, hosts, and/or other network-enabled components. Second, the functionality of the system of FIG. 2 may be provided and/or enabled by the notification service (e.g., APNs), an authentication service, and/or other components and/or services described herein and/or in the above-referenced application.

Figure 3:
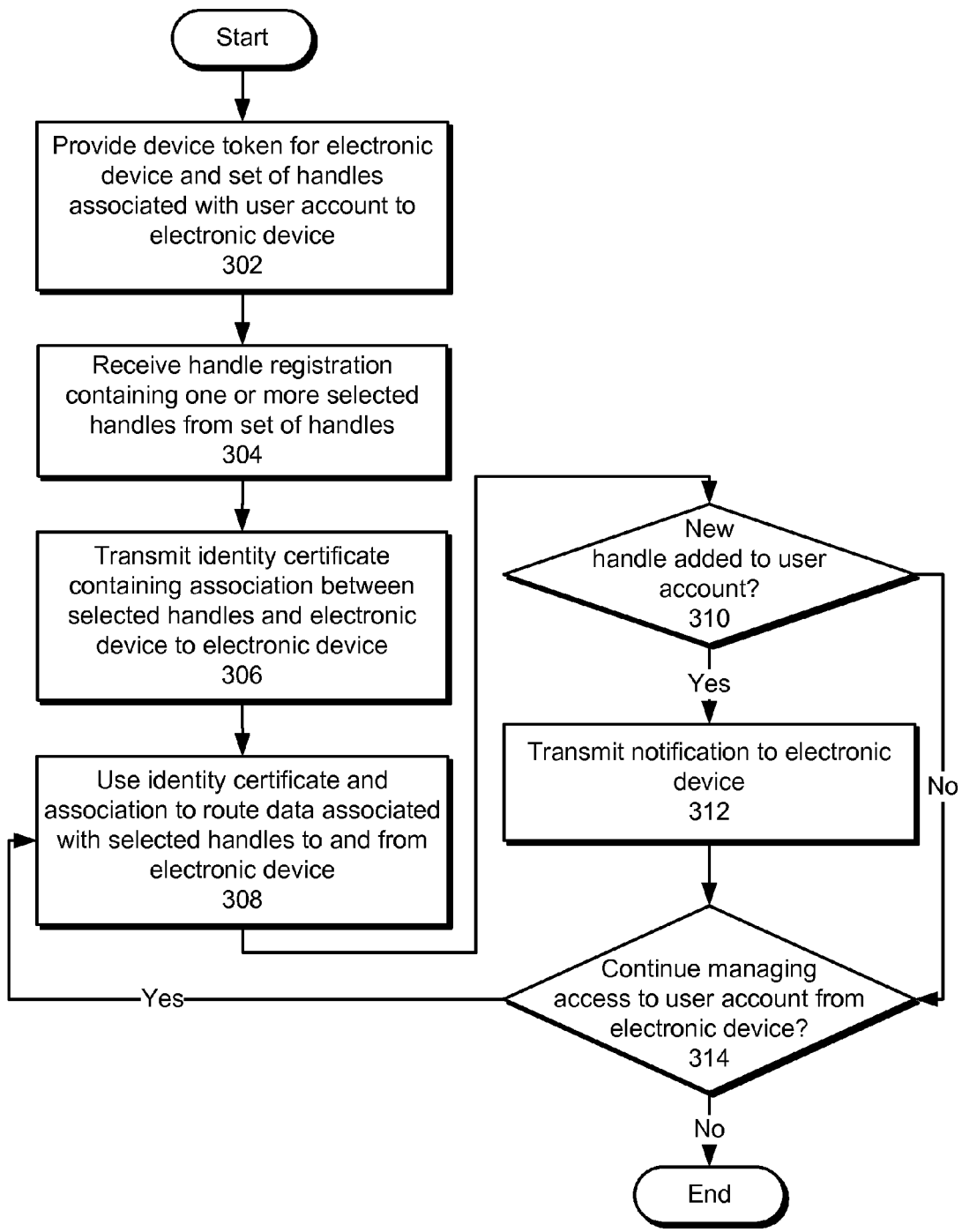
FIG. 3 shows a flowchart illustrating the process of managing access to a user account from an electronic device in accordance with the disclosed embodiments.

FIG. 3 shows a flowchart illustrating the process of managing access to a user account from an electronic device in accordance with the disclosed embodiments. In one or more embodiments, one or more of the steps may be omitted, repeated, and/or performed in a different order. Accordingly, the specific arrangement of steps shown in FIG. 3 should not be construed as limiting the scope of the technique.

First, a device token for the electronic device and a set of handles associated with the user account are provided to the electronic device (operation 302). Each of the handles may be verified prior to obtaining the account credentials from the electronic device. Moreover, the device token may include an authentication token and/or push token that is initially transmitted to the electronic device. After the device token is subsequently received from the electronic device (e.g., during registration of the device token), the set of handles may be transmitted to the electronic device.

Next, a handle registration containing one or more selected handles from the set of handles is received from the electronic device (operation 304), and an identity certificate containing an association between the selected handles and the electronic device is transmitted to the electronic device (operation 306). The identity certificate may be a signature over the selected handles and the device token and represent the electronic device's trusted identity with the identity service.

The identity certificate and association may then be used to route data associated with the selected handles to and from the electronic device (operation 308). For example, the identity certificate may allow the electronic device to send and receive messages, voice chats, and/or video calls with other electronic devices without requiring the electronic device and/or other electronic devices to repeatedly verify the sources of the messages, voice chats, and/or video calls with an identity service (e.g., identity service 106 of FIG. 1).

A new handle may also be added to the user account (operation 310). For example, the new handle may be added by another electronic device configured for use with the user account and/or during a device-agnostic configuration of the user account. If the addition of a new handle to the user account is detected, a notification is transmitted to the electronic device (operation 312) and used by the electronic device to update the selected handles with the new handle, as discussed in further detail below with respect to FIG. 4. To transmit the notification, the device token for the electronic device may be added to the notification and used to route the notification to the electronic device (e.g., using a notification service). If a new handle has not been added to the user account, no notification is transmitted to the electronic device.

Access to the user account from the electronic device may continue to be managed (operation 314). For example, management of access to the user account from the electronic device may continue during use of the electronic device with the user account. If management of access to the user account from the electronic device is to continue, the identity certificate and association are used to route data associated with the selected handles to and from the electronic device (operation 308), and any changes to the handles associated with the user account are synchronized with the electronic device (operations 310-312). Access to the user account from the electronic may thus be managed until the electronic device is no longer used and/or configured for use with the user account.

Figure 4:
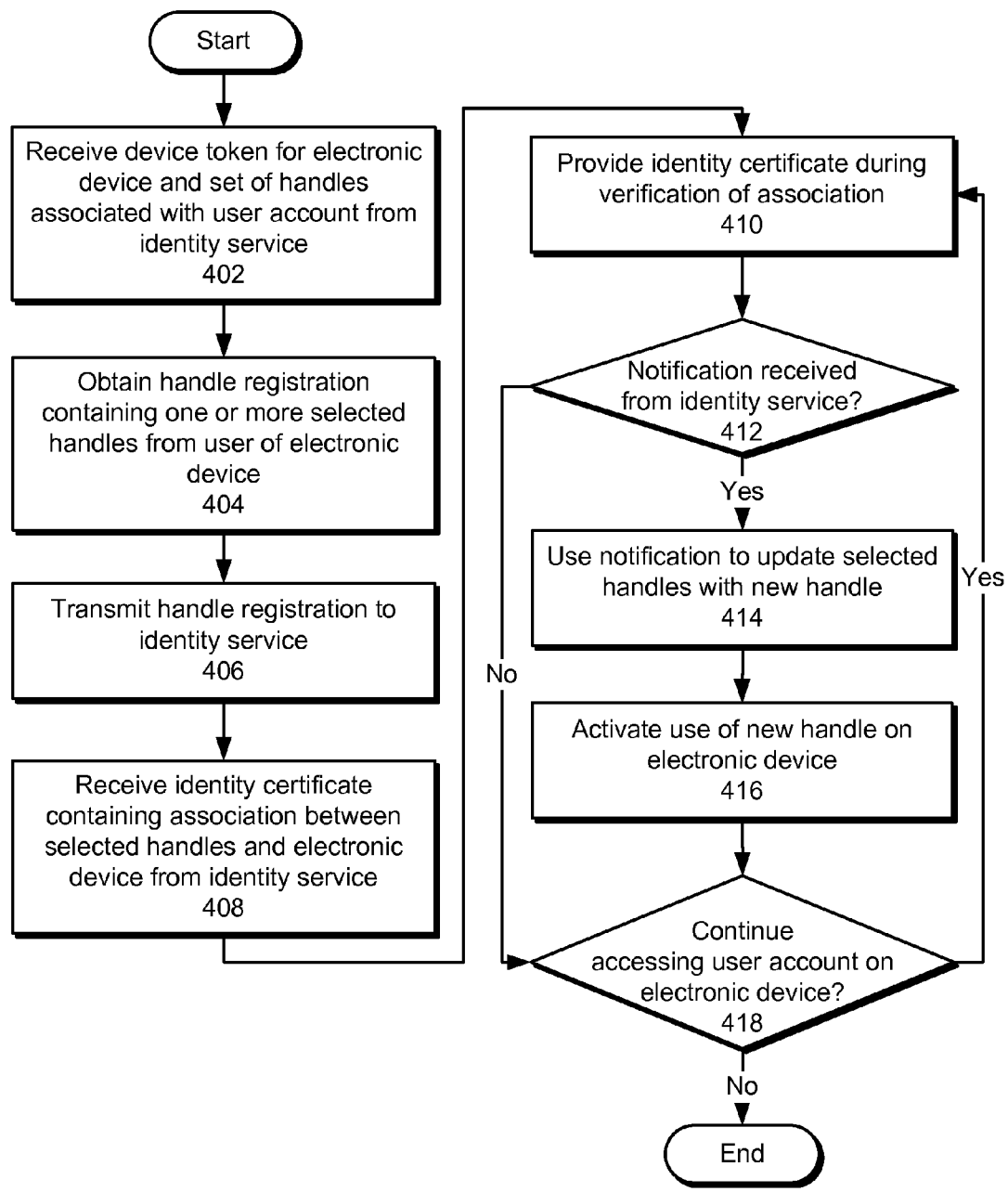
FIG. 4 shows a flowchart illustrating the process of accessing a user account on an electronic device in accordance with the disclosed embodiments.

FIG. 4 shows a flowchart illustrating the process of accessing a user account on an electronic device in accordance with the disclosed embodiments. In one or more embodiments, one or more of the steps may be omitted, repeated, and/or performed in a different order. Accordingly, the specific arrangement of steps shown in FIG. 4 should not be construed as limiting the scope of the technique.

Initially, a device token for the electronic device and a set of handles associated with the user account are received from the identity service (operation 402). The device token and handles may be received on the electronic device, such as a personal computer, laptop computer, tablet computer, mobile phone, portable media player, PDA, digital media receiver, and/or other network-enabled device.

Next, a handle registration containing one or more selected handles from the set of handles is obtained from a user of the electronic device (operation 404). For example, the set of handles may be displayed to the user by the electronic device, and the user may provide the handle registration by selecting and/or highlighting a subset of the displayed handles.

The handle registration is then transmitted to the identity service (operation 406), and an identity certificate containing an association between the selected handles and the electronic device is received from the identity service (operation 408). The identity certificate may subsequently be provided by the electronic device during verification of the association (operation 410). For example, the identity certificate may allow other electronic devices to establish the trusted identity of the electronic device without querying the identity service every time a communication is transmitted from the electronic device to the other electronic devices.

A notification may also be received from the identity service (operation 412). If a notification is received, the notification is used to update the selected handles with a new handle (operation 414) and activate use of the new handle on the electronic device (operation 416). For example, the electronic device may update the handle registration with the new handle by obtaining an up-to-date set of handles associated with the user account from the identity service, transmitting an updated handle registration containing the new handle to the identity service, and receiving a new identity certificate from the identity service. The electronic device may then activate use of the new handle on the electronic device by enabling communication and/or interaction between the electronic device and other electronic device using the new handle. In addition, the handle registration may automatically be updated with the new handle, or a user of the electronic device may be notified of the addition of the new handle to the handle registration and/or queried for approval to add the new handle to the handle registration. If no notification is received from the identity service, no changes are made to the handle registration.

Access to the user account on the electronic device may continue (operation 418). If access to the user account on the electronic device is to continue, the identity certificate is provided during verification of the association (operation 410) between the selected handles and the electronic device, and notifications from the identity service are used to synchronize handles associated with the user account with the electronic device (operation 412-416). The electronic device may thus be used to access the user account until the electronic device is no longer in use and/or configured for use with the user account.

Figure 5:
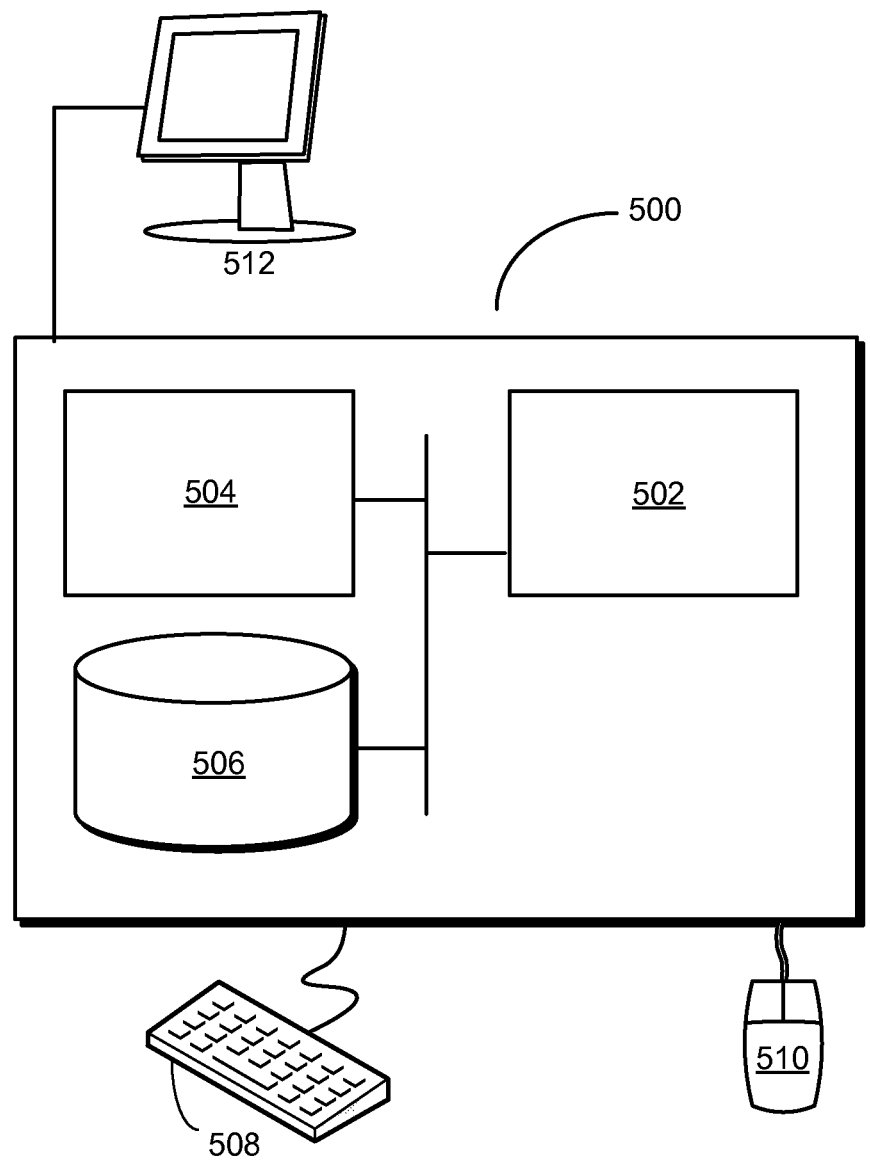
FIG. 5 shows a computer system in accordance with the disclosed embodiments.

FIG. 5 shows a computer system 500 in accordance with the disclosed embodiments. Computer system 500 may correspond to an apparatus that includes a processor 502, memory 504, storage 506, and/or other components found in electronic computing devices. Processor 502 may support parallel processing and/or multi-threaded operation with other processors in computer system 500. Computer system 500 may also include input/output (I/O) devices such as a keyboard 508, a mouse 510, and a display 512.

Computer system 500 may include functionality to execute various components of the present embodiments. In particular, computer system 500 may include an operating system (not shown) that coordinates the use of hardware and software resources on computer system 500, as well as one or more applications that perform specialized tasks for the user. To perform tasks for the user, applications may obtain the use of hardware resources on computer system 500 from the operating system, as well as interact with the user through a hardware and/or software framework provided by the operating system.

In one or more embodiments, computer system 500 provides a system for managing access to a user account from an electronic device. The system may include an identity service that provides a device token for the electronic device and a set of handles associated with the user account to the electronic device. Next, the identity service may receive a handle registration containing one or more selected handles from the set of handles from the electronic device. Finally, the identity service may transmit an identity certificate containing an association between the selected handles and the electronic device to the electronic device and subsequently use the identity certificate and the association to route data associated with the selected handles to and from the electronic device.

Alternatively, computer system 500 may implement the electronic device. The electronic device may obtain the selected handles from a user of the electronic device and provide the handle registration to the identity service. Next, the electronic device may receive the identity certificate from the electronic device and subsequently provide the identity certificate to the identity service during verification of the association.

In addition, one or more components of computer system 500 may be remotely located and connected to the other components over a network. Portions of the present embodiments (e.g., directory service, identity service, electronic devices, etc.) may also be located on different nodes of a distributed system that implements the embodiments. For example, the present embodiments may be implemented using a cloud computing system that manages access to a user account from a set of remote electronic devices.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A method for managing access to a user account from an electronic device, comprising:
   associating a set of handles with the user account, each handle configured to be used to access, by the electronic device, a separate corresponding external user account, each external user account different from the user account;
   providing a device token for the electronic device and the set of handles associated with the user account to the electronic device;
   receiving a handle registration comprising one or more selected handles from the set of handles; and
   transmitting an identity certificate comprising a plurality of associations, each association being between one of the selected handles and the electronic device, to the electronic device, wherein the identity certificate and the plurality of associations are used to route data associated with the selected handles to and from the electronic device.

2. The method of claim 1, further comprising:
   detecting an addition of a new handle to the user account; and
   transmitting a notification to the electronic device, wherein the notification is used by the electronic device to update the selected handles with the new handle.

3. The method of claim 2, wherein transmitting the notification to the electronic device comprises:
   adding the device token to the notification; and
   using the device token to transmit the notification to the electronic device.

4. The method of claim 1, wherein providing the device token and the set of handles associated with the user account to the electronic device comprises:
   transmitting the device token to the electronic device; and
   upon receiving the device token from the electronic device, transmitting the set of handles to the electronic device.

5. The method of claim 1, wherein each handle from the set of handles is verified prior to obtaining the account credentials from the electronic device.

6. The method of claim 1, wherein the data is associated with at least one of a messaging application, a voice chat application, and a video calling application.

7. The method of claim 1, wherein the set of handles comprises at least one of an email address and a phone number.

8. A method for accessing a user account on an electronic device, comprising:
   receiving, on the electronic device, a device token for the electronic device and a set of handles associated with the user account from an identity service, the set of handles being associated with the user account by the identity service, each handle configured to be used to access, by the electronic device, a separate corresponding external user account, each external user account different from the user account;
   transmitting a handle registration comprising one or more selected handles from the set of handles to the identity service; and
   receiving an identity certificate comprising a plurality of associations, each association being between one of the selected handles and the electronic device, from the identity service, wherein the identity certificate is subsequently provided by the electronic device during verification of the association, and wherein the plurality of associations are used to route data associated with the selected handles to and from the electronic device.

9. The method of claim 8, further comprising:
   obtaining the selected handles from a user of the electronic device.

10. The method of claim 8, further comprising:
    receiving, on the electronic device, a notification from the identity service; and
    using the notification to update the selected handles with the new handle.

11. The method of claim 10, further comprising:
    activating use of the new handle on the electronic device.

12. The method of claim 10, wherein using the notification to update the selected handles with the new handle comprises at least one of:
    automatically updating the handle registration with the new handle; and
    notifying a user of the electronic device of the new handle.

13. The method of claim 8, wherein the set of handles comprises at least one of an email address and a phone number.

14. A system for managing access to a user account from an electronic device, comprising:
    an identity service comprising at least one server configured to:
      associate a set of handles with the user account, each handle configured to be used to access, by the electronic device, a separate corresponding external user account, each external user account different from the user account;
      provide a device token for the electronic device and the set of handles associated with the user account to the electronic device;
      receive a handle registration comprising one or more selected handles from the set of handles; and
      transmit an identity certificate comprising a plurality of associations, each association being between one of the selected handles and the electronic device, to the electronic device, wherein the identity certificate and the plurality of associations are used to route data associated with the selected handles to and from the electronic device; and the electronic device configured to:
    provide the identity certificate during verification of the association; and
    use the plurality of associations to route data associated with the selected handles to and from the electronic device.

15. The system of claim 14, further comprising:
    a directory service comprising account information for the user account, wherein the account information comprises account credentials for the user account and the set of handles.

16. The system of claim 15, wherein the identity service is further configured to:
    receive an addition of a new handle to the user account from the directory service; and
    transmit a notification to the electronic device.

17. The system of claim 16, wherein the electronic device is further configured to:
    use the notification to update the selected handles with the new handle.

18. The system of claim 17, wherein using the notification to update the selected handles with the new handle comprises at least one of:

automatically updating the handle registration with the new handle; and notifying a user of the electronic device of the new handle.

19. The system of claim 14, wherein the electronic device is further configured to:

obtain the selected handles from a user of the electronic device.

20. The system of claim 14, wherein the data is associated with at least one of a messaging application, a voice chat application, and a video calling application.

21. A computer-readable storage medium storing instructions that when executed by a computer cause the computer to perform a method for managing access to a user account from an electronic device, the method comprising:

associating a set of handles with the user account, each handle configured to be used to access, by the electronic device, a separate corresponding external user account, each external user account different from the user account;

providing a device token for the electronic device and the set of handles associated with the user account to the electronic device;

receiving a handle registration comprising one or more selected handles from the set of handles; and transmitting an identity certificate comprising a plurality of associations, each association being between one of the selected handles and the electronic device, to the electronic device, wherein the identity certificate and the plurality of associations are used to route data associated with the selected handles to and from the electronic device.

22. The computer-readable storage medium of claim 21, the method further comprising:

detecting an addition of a new handle to the user account; and transmitting a notification to the electronic device, wherein the notification is used by the electronic device to update the selected handles with the new handle.

23. The computer-readable storage medium of claim 22, wherein transmitting the notification to the electronic device comprises:

adding the device token to the notification; and using the device token to transmit the notification to the electronic device.

24. A computer-readable storage medium storing instructions that when executed by a computer cause the computer to perform a method for accessing a user account on an electronic device, the method comprising:

receiving, on the electronic device, a device token for the electronic device and a set of handles associated with the user account from an identity service, the set of handles being associated with the user account by the identity service, each handle configured to be used to access, by the electronic device, a separate corresponding external user account, each external user account different from the user account;

transmitting a handle registration comprising one or more selected handles from the set of handles to the identity service; and obtaining an identity certificate comprising a plurality of associations, each association being between one of the selected handles and the electronic device, from the identity service, wherein the identity certificate is subsequently provided by the electronic device during verification of the association, and wherein the plurality of associations are used to route data associated with the selected handles to and from the electronic device.

25. The computer-readable storage medium of claim 24, the method further comprising:

obtaining the selected handles from a user of the electronic device.

26. The computer-readable storage medium of claim 24, the method further comprising:

receiving, on the electronic device, a notification from the identity service; and using the notification to update the selected handles with the new handle.

27. The computer-readable storage medium of claim 24, the method further comprising:

activating use of the new handle on the electronic device.

28. The computer-readable storage medium of claim 24, wherein using the notification to update the selected handles with the new handle comprises at least one of:

automatically updating the handle registration with the new handle; and notifying a user of the electronic device of the new handle.

29. The method of claim 1, wherein:

the handle registration is received from the electronic device as part of an identity service registration or update process; or the handle registration is received from a second electronic device as part of a synchronization process with the electronic device.

30. The method of claim 8, wherein:

the handle registration is transmitted by the electronic device as part of an identity service registration or update process; or the handle registration is transmitted by a second electronic device as part of a synchronization process with the electronic device.

31. The system of claim 14, wherein:

the handle registration is transmitted by the electronic device as part of an identity service registration or update process; or the handle registration is transmitted by a second electronic device as part of a synchronization process with the electronic device.

32. The computer-readable storage medium of claim 21, wherein:

the handle registration is received from the electronic device as part of an identity service registration or update process; or the handle registration is received from a second electronic device as part of a synchronization process with the electronic device.

33. The computer-readable storage medium of claim 24, wherein:

the handle registration is transmitted by the electronic device as part of an identity service registration or update process; or the handle registration is transmitted by a second electronic device as part of a synchronization process with the electronic device.

* * * * *